United States Patent Office 2,718,279
Patented Sept. 20, 1955

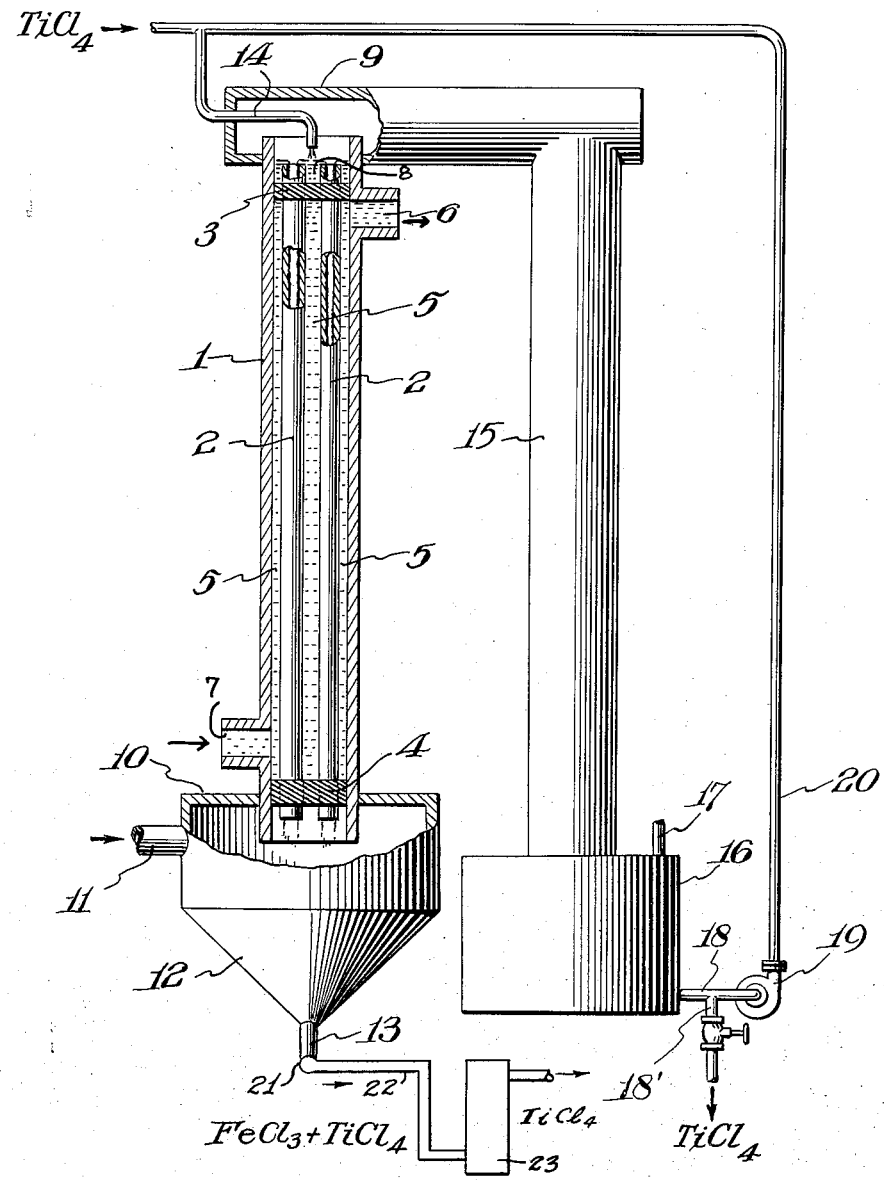

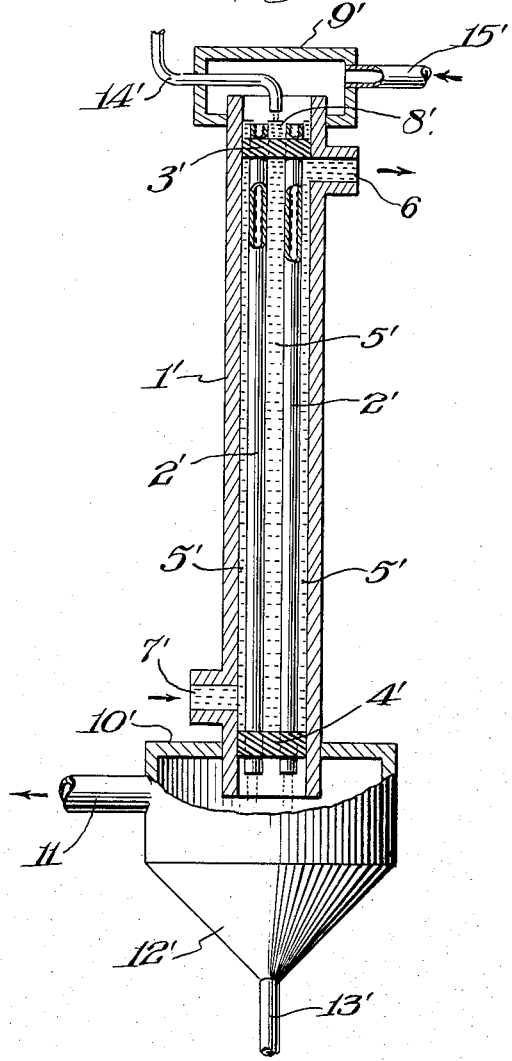

2,718,279

PROCESS FOR CONDENSING VAPORIZED METAL HALIDES

Philip B. Kraus, Landenberg, Pa., assignor to E. I. du Pont de Nemours and Company, Wilmington, Del., a corporation of Delaware Application December 18, 1952, Serial No. 326,689

11 Claims. (Cl. 183—120)

This invention relates to the condensation of vaporized materials which normally condense to the solid rather than liquid state. More particularly, it relates to the condensation of metallic halides, especially iron chloride, from vaporous mixtures containing the chlorides of both titanium and iron.

Titanium tetrachloride is generally produced by reacting titanium-bearing materials, such as ilmenite ore, at elevated temperatures with chlorine, usually in the presence of a reducing agent such as carbon, followed by volatilization of the titanium tetrachloride away from the residual solid mixture. Most titanium-bearing materials employed in the process contain substantial amounts of iron, and as a result iron (ferric) chloride also forms and is volatilized during the chlorination. The gases leaving the reactor normally comprise titanium tetrachloride, ferric chloride, carbon monoxide, carbon dioxide, unreacted chlorine and minor amounts of other metallic chlorides, including those of silicon or aluminum. If a mixture of chlorine with nitrogen rather than pure chlorine is employed in the chlorination, large amounts of nitrogen also exist in the exhaust gases.

As examples of typical, approximate compositions of the reactor discharge gases from a chlorination process in which a mixture of ilmenite and carbon is reacted with a chlorinating gas, the following tabulation is given:

| Chlorinating Gas | Chlorinating Gas | |
|---|---|---|
| | Case I | Case II |
| | 100% Chlorine | 30% Chlorine, 70% Nitrogen |
| Titanium tetrachloride | 33.5% by vol | 10% by vol. |
| Iron chlorides | 9.8% by vol | 2.9% by vol. |
| Carbon dioxide | 41.5% by vol | 12.3% by vol. |
| Carbon monoxide | 10.4% by vol | 3.1% by vol. |
| Chlorine | 4.8% by vol | 1.3% by vol. |
| Nitrogen | None | 70.4% by vol. |
| Other metal chlorides (SiCl₄, AlCl₃, MgCl₂, CaCl₂) | slight amounts | slight amounts. |

The boiling points at atmospheric pressure of titanium tetrachloride and of ferric chloride are, respectively, 136.4° C. and 315° C. The temperatures at which ferric chloride commences to condense from the gas mixtures of the above type, i. e., the dewpoints thereof, are approximately 270° C. for Case I and 250° C. for Case II. The dewpoints for titanium tetrachloride in such mixtures are approximately 100° C. and 65° C., respectively. The dewpoints for ferrous chloride, if present, would be approximately 580° C. and 530° C., respectively. These dewpoints represent the temperatures at which condensation begins, although progressively lower temperatures are required for condensation as the concentration diminishes. For example, the dewpoints of titanium and iron chlorides, present in a gas mixture to the extent of one per cent, are, respectively, 15° C. and 230° C.

In spite of the considerable difference in vapor pressures of titanium tetrachloride and of ferric chloride and the expectancy that their fractional separation through condensation might be relatively simple, the fractional condensation of their vaporized mixtures has proved practically very difficult, owing to the properties and characteristics of ferric chloride. Thus, at temperatures below its boiling point ferric chloride is a solid and hence condenses directly to that state from the gas phase. In conventional condensing apparatus the bulk of the cooling to effect condensation takes place through the condenser walls and the ferric chloride precipitates on such cool surfaces, tends to form a hard deposit thereon which is very difficult to remove, reduces heat transfer through the apparatus walls, and eventually plugs up and causes shutdown of the apparatus, due to its progressive buildup on such walls. If the condensation occurs in the gas stream, fine particles of solid ferric chloride remain in suspension and are carried out of the condenser with the uncondensed titanium tetrachloride gases. The presence of these suspended fine particles is very undesirable because they not only contaminate the titanium tetrachloride which is subsequently condensed, but they induce additional equipment plugging wherever the gas stream passes through a relatively narrow aperture in the apparatus.

Various expedients designed to overcome such undesired plugging and to provide a continuous type of chlorination operation have been proposed heretofore but none has proved practically effective for the intended purpose. Thus, it has been proposed to overcome the involved difficulties by condensing a substantial portion of the titanium tetrachloride with iron chloride to form a more fluid mass adapted to be removed from the condenser walls by mechanical means and to thereafter distill the titanium tetrachloride out of the condensed iron chlorides. Another proposal is to condense the iron chloride in the gas mixture, together with a substantial portion of the titanium tetrachloride, and to thereafter wash the vapor mixture containing a portion of the iron chloride with a spray of liquid titanium tetrachloride to "strip out" the suspended iron chloride.

It is among the objects of this invention to obviate these and other disadvantages of prior metal halide recovery methods, especially those existing in the recovery of titanium tetrachloride from gaseous mixtures with iron chloride, and to provide novel methods and means for attaining such objects. A particular object is to provide a continuous, commercially useful type of process for separating and recovering TiCl₄ from gaseous iron chloride mixtures containing the same without the attendant, objectionable apparatus plugging and stoppage due to ferric chloride condensation which characterize prior recovery methods. Further particular objects are (a) to condense the vaporized chlorides of iron, calcium and magnesium from mixtures of such vapors and titanium tetrachloride; (b) to condense FeCl₃, FeCl₂, MgCl₂ and CaCl₂ vapors from gaseous mixtures of those vapors and TiCl₄ by removal of heat from the mixture in contrast to condensation by dilution with a material at lower temperature; and (c) to effect this condensation without fouling or insulating the heat transfer surface by undesired accumulation of solid metallic chlorides. An additional advantageous object is to effect such condensation without undesired vaporization of liquid TiCl₄ employed as a washing medium for the condenser walls and with a minimum of cooler or condenser capacity. Other and further objects and advantages of the invention will be apparent from the ensuing description thereof and from the accompanying diagrammatic drawing in which:

Fig. I is a vertical, sectional view of one form of useful apparatus for carrying out the invention; while Fig. II is a modified form of such apparatus.

These and other objects are obtainable in this invention which broadly comprises continuously flowing an inert liquid in the form of a film over the internal wall surfaces of a condenser through which a gaseous mixture containing a halide which condenses to the solid phase is being passed to effect condensation of said halide, said firm being adequate to substantially isolate said gaseous mixture from direct contact with said wall surfaces and said inert liquid being more volatile than the halide being condensed.

In a more specific and preferred embodiment, the invention comprises continuously flowing a relatively thin film of liquid titanium tetrachloride as a washing fluid over the internal walls of an externally cooled condensing apparatus through a restricted passage of which a gaseous mixture of ferric chloride and titanium tetrachloride is being continuously passed for condensation and separation of said ferric chloride, said liquid film being sufficient in depth to isolate and maintain said gaseous mixture out of direct contact with the walls of said condenser throughout the ferric chloride condensation process.

In practically applying the invention in accordance with such preferred embodiment, ferric chloride-titanium tetrahalide gas mixtures of the appropriate compositions shown in Tables I and II above (depending on whether pure chlorine or a mixture of chlorine with nitrogen is used in their preparation) are fed for treatment in any desired manner and from a source of supply (not shown) to a suitable condenser, such as of the type shown in Fig. I. This gaseous mixture can be obtained by chlorinating, in accordance with known procedures, titaniferous materials (rutile, ilmenite or suitable $TiO_2$ concentrates) at elevated temperatures (600°–1100° C.) in the presence of a solid or gaseous reducing agent, such as carbon, charcoal, coal, etc., a useful and preferred method for yielding an anhydrous metal chloride volatile at the temperature of formation comprising that disclosed in the copending application of Robert M. McKinney, Serial No. 588,973, filed April 18, 1945, now abandoned. Other useful chlorinating methods include those disclosed in U. S. Patents 1,179,394, 1,528,319, and 1,878,013. Said condenser consists preferably of a cylindrical casing 1 within which one or more tubular members 2 are suitably positioned, through which the gaseous mixture under treatment is caused to flow for fractional condensation. The tubular members 2 are spacedly disposed from each other and from the internal walls of the casing member 1 by means of being positioned for retention within collar members 3 and 4.

Said collar members are, in turn, secured to and positioned within the upper and lower portions of the casing to form the sealed-off condenser channels 5 about the tubular members 2 and within the interior of the casing walls 1. In this fashion said tubular members 2 can be suitably jacketed with water or other desired cooling fluid which can be continuously flowed through the condenser and channels 2 via casing inlet 7 in the lower portion of the condenser and casing outlet 6 in its upper portion. The upper limits or outlets of the members 2 extend a relatively short distance above and beyond the confines of the retaining collar 3 whereby a suitable reservoir 8 is formed and for a purpose to presently appear. Disposed above the cylindrical casing 1 is an upper casing head member 9 while a lower casing head 10 is provided in its bottom portion. The casing head members 9 and 10 are in open communication with each other by means of the interior passages of the tubular members 2. Associated with casing head 10 is an inlet 11 through which the gaseous mixture being treated can enter the base of the condenser for flow upwardly through the tubes 2 and ultimate discharge into the casing head 9. Also associated with the casing head 10 is a conical reservoir 12 in which ferric chloride and liquid titanium tetrachloride is collected for subsequent withdrawal from the system via condenser outlet 13. Suitably disposed in the head member 9 is a conduit 14 through which, as shown,
liquid $TiCl_4$ is fed into the reservoir 8. The head member 9 is in open communication with a secondary condenser 15, suitably cooled as by water jacketing, and into which gases leaving the primary condenser 1 discharge for condensation and recovery of their $TiCl_4$ component. The resulting condensate from the condenser 15 passes to a secondary collector or reservoir 16, provided with an outlet means 17 adapted to exhaust uncondensed gases from the system, as well as an outlet 18, leading to a valve-controlled conduit 18' through which condensed liquid $TiCl_4$ is withdrawn. Disposed in the line 18 is a conventional type pump 19, the outlet of which discharges into a line 20, communicating with the conduit 14, whereby liquid $TiCl_4$ produced in the system can be readily recycled as desired for use or reuse.

In practicing the invention in the type of condenser shown in Fig. I, a mixture of ferric chloride-titanium tetrachloride furnace gases is fed directly, without prior cooling and while at temperatures ranging from 800–1200° C. (usually at about 1000° C.) to the condenser inlet 11, passing upwardly therethrough via the tubular members 2 which are externally cooled by reason of the continuous passage of water about said tubes from an inlet 7, through channels 5 and outlet 6. Sufficient heat transfer surface is provided in the condenser to cool said gases to about 150–700° C., and preferably to about 300–500° C. Prior to introduction of the gas mixture, liquid titanium tetrachloride is run from the line 14 into the reservoir 8 at the top of the condenser, overflows from said reservoir in such amount and controlled quantity into the open ends of tubes 2 to provide a continuous, falling or flowing liquid film covering and washing the entire inside surface or area of said tubes 2 to ultimately drop from the bottom or outlet portion of said tubes into the collector 12. As the gases under treatment rise through the tubes 2, they become cooled at the liquid surface of the falling $TiCl_4$ film but are effectively prevented from coming in direct contact with the internal surfaces of said tubes which would induce undesired plugging thereof. During such treatment, vaporous ferric chloride is condensed, and at the indicated temperatures condensation of $MgCl_2$ and $CaCl_2$ to the solid state is essentially complete. Condensation of $FeCl_2$ also becomes more or less complete depending upon the final temperature chosen, the lower temperature range being preferable. With high turbulence on the gas stream, such as is achieved with velocities of 40–60 ft./sec., substantial amounts of $FeCl_3$ are also condensed. Under the normal conditions of operation $TiCl_4$ neither condenses nor evaporates within the accuracy of experimental measurements. Stated another way, the dew point of the $TiCl_4$ in the gas stream remains unchanged and is close to the temperature of the liquid $TiCl_4$ on the wall. Since this condensation takes place principally at the surface of the liquid film, the condensed iron chloride is immediately wet by and carried away with the titanium tetrachloride film for ultimate discharge from the system through the condenser collector outlet 13. When the proper amount of liquid titanium tetrachloride is maintained in the reservoir 8, the liquid film will be maintained at a fluid consistency in spite of the presence of solid condensate and will readily flow in the form of a film down the walls of the tubes 2. In this manner the ferric chloride as well as other metal chlorides are effectively prevented from coming in contact with a dry, cooled metallic surface of the condenser where it would deposit and remain, building up thereon as an adherent insulating layer to eventually plug the condenser and require shutdown for clean-out. The layer or film of liquid $TiCl_4$ thus effectively isolates the ferric chloride from the condenser surfaces and avoids and prevents plugging or stoppage of the apparatus during the condensation.

The ferric chloride condensate withdrawn from the collector 12 through conduit 13 (containing 50% to 80% titanium tetrachloride) can be transferred by means of a pump 21 and conduit 22 to a suitable separator 23 in which the titanium tetrachloride is recovered by distillation. If desired, the temperature of the collector may be maintained at from about 120° C. to 137° C. to maintain all or part of the titanium tetrachloride at this point in vaporized condition.

The gases leaving the top of the primary condenser through the header 9 will have the major portion of their ferric chloride component condensed out, and pass to a secondary condenser 15 wherein additional titanium tetrachloride condensation is effected, which liquid $TiCl_4$ is collected in the storage vessel 16. Gases leaving said secondary condenser via outlet 17 may, if desired, be subjected to suitable stripping treatment, such as by passage through a brine-chilled condenser or adsorption on surface-active materials or the like, in order to recover the last traces of titanium tetrachloride, or, if preferred, may be recycled for retreatment in the primary condenser 1. As already noted, part of the $TiCl_4$ condensate may be recycled from the vessel 16 via pump 19, line 20 and conduit 14, to the reservoir 8 for reuse in the system in providing the liquid film in the tubes 2.

Alternatively, the gases, on leaving the washed wall condenser, can be fed to a suitable spray condenser, such as that described in U. S. Patent 2,446,181, where further condensation of iron chlorides can be completed if necessary as by cooling the gas to about 130–180° C. by evaporation of a $TiCl_4$ slurry sprayed onto the condenser. This spray condenser can also serve as a convenient method and means of separating the solid metallic chlorides condensed in the washed wall condenser from the liquid $TiCl_4$. The gases leaving the spray condenser can be washed with $TiCl_4$, if desired, to complete the removal of solid particles of metallic chlorides and finally cooled to a low temperature in the range of −20 to +20° C. to condense $TiCl_4$.

To a more complete understanding of the invention, the following specific examples are given, which are merely illustrative and are not intended to be in restriction of the invention:

Example I

Ilmenite ore was briquetted with coal and a binding material and fed into a furnace maintained at about 900° C. Chlorine was passed through the furnace at such a rate that about 90% was converted to chlorides, and gave a furnace gas having a volume composition of 31.7% titanium tetrachloride, 9.3% ferric chloride, 39.3% carbon dioxide, 9.8% carbon monoxide, and 9.9% chlorine, with traces of silicon tetrachloride. The gas rate was such that 21.3 pounds of titanium tetrachloride and 10.7 pounds of ferric chloride were produced per hour.

This gas mixture was conveyed to a condenser of the type substantially like than shown in Fig. I and while at a temperature of about 450° C. The condenser was provided with three tubes, one inch in diameter, enclosed in a casing eight feet tall and four inches in diameter. The reservoir at the top of the condenser was one-half inch deep. During the run 21.6 pounds per hour of titanium tetrachloride at 20° C. were continuously introduced into said reservoir, to continuously and uniformly overflow in the form of a film covering the entire surface area of the tubes with which the gases might otherwise contact during the run. Cooling water at 15° C. was circulated through the jacket at such a rate that 75% of the titanium tetrachloride in the furnace gases, or 16 pounds per hour, was condensed, giving a total of 37.6 pounds per hour flowing down the tube walls. During the course of the run substantially all of the ferric chloride was condensed by and removed with the falling film. No adhering deposit of ferric chloride formed on the condenser tubes or stoppage of flow due to plugging occurred in the condenser during the run.

In this case the average ratio of titanium tetrachloride to ferric chloride in the falling film was 37.6 to 10.7, or about 3.5 to 1 by weight, which gave a very thin slurry which was drawn off from the collector and distilled to recover titanium tetrachloride.

The gases leaving the primary condenser and containing the remaining 5.3 pounds per hour of titanium tetrachloride (11.8% by volume) were conveyed to a secondary condenser, where 4.6 pounds per hour of titanium tetrachloride were condensed and recovered.

Example II

Ilmenite ore was briquetted and chlorinated as described in Example I to obtain a gas having the same composition as shown in said example. This gas was conveyed while at a temperature of 450° C. to a condenser of the type shown in my issued U. S. Patent No. 2,446,181, dated August 3, 1948, wherein liquid $TiCl_4$ is caused to be quickly sprayed or dispersed throughout said gas by means of the impingement of the $TiCl_4$ onto the surfaces of a disc element rotating at a relatively high rate of speed. By controlling the quantity of $TiCl_4$ sprayed into the condenser, the temperature of the gases becomes reduced from 450° C. to 180° C., the liquid $TiCl_4$ spray becoming evaporated in the process. The iron chlorides present in the gases are substantially all condensed to the solid phase and 80% of this condensate is removed from the condenser as anhydrous crystals which are substantially free of $TiCl_4$.

The gas stream containing the remaining 20% of the iron chloride suspended in it is then passed into the bottom of a condenser of the type shown in Fig. I, for upward flow therethrough and in direct contact with a continuously-falling film of liquid $TiCl_4$ flowing over the condenser walls or tubes to prevent plugging and reduced rates of heat transfer due to buildup of condensed iron chloride. The major part of the $TiCl_4$ vapor in the gas stream is thus condensed and removed from the bottom of the condenser for recirculation to maintain the falling film of $TiCl_4$. Removal of 5% of the iron chloride takes place in this condenser. The gases from the condenser are led to a brine-cooled condenser of the same type where additional $TiCl_4$ is removed from the gas stream. The condensate and wash liquid from this condenser are recycled to maintain the falling film on the condenser walls. A portion of the condensate from this condenser and from the previous washed wall condenser is recirculated to the spray disc in the first condenser and a portion is distilled to obtain an impure $TiCl_4$ product. A 30% $FeCl_3$-$TiCl_4$ slurry is also recycled back to the first condenser. As in the instance of Example I, no adhering $FeCl_3$ deposit formed on the tubes of the condenser and no stoppage due to plugging occurred throughout the run.

While described as applied to certain specific and preferred embodiments, the invention is not restricted thereto since suitable variation may be made therefrom without departing from its underlying principles and scope. Thus, by using tubes of suitable length and diameter, by controlling the gas rate, the quantity of liquid titanium tetrachloride introduced and allowed to overflow from the reservoir and the amount of cooling effected, substantially all of the ferric chloride can be condensed by means of the relatively thin, isolating liquid film or layer caused to be continuously flowed over or bathe the surfaces of the condenser. Most of the condensate formed as a result of this treatment will be caught and removed from the system by such film. If desired, a second condenser provided with falling film of titanium tetrachloride to effect condensation can also be employed in series with the primary condenser to completely condense and remove ferric chloride, but this is usually unnecessary.

Similarly, the amount of titanium tetrachloride flowing down the restricted conduit walls may be augmented, if desired, by the condensation of a portion of that contained in the furnace gases being treated. This may be permitted to occur to such an extent that some of the titanium tetrachloride from the furnace gases actually is removed with the ferric chloride condensate, or the conditions of operation may be so adjusted that titanium tetrachloride is condensed in the upper portion of the condenser and is revaporized at the lower, hotter portion, giving in effect a reflux while still allowing as much to leave the first condenser as enters with the furnace gases. In order to avoid the use of excessive amounts of liquid titanium tetrachloride, it is desirable that conditions be adjusted so that there is no net loss, as vapor, of the added liquid titanium tetrachloride. This vaporization can be prevented by use of sufficient cooling water and by maintaining the temperature of the titanium tetrachloride as fed to the reservoir well below the dewpoint of the exit gases. Such control is also desirable to effect relatively complete condensation of ferric chloride since when the liquid film is maintained at a temperature lower than the titanium tetrachloride dewpoint, only extremely small amounts of ferric chloride can remain in the vapor phase.

The amount of liquid titanium tetrachloride added from the reservoir together with any net titanium tetrachloride condensate in the condenser must be sufficient to take up the condensed ferric chloride without becoming too viscous to flow readily down the tube walls. I have found that mixtures of equal parts by weight of ferric chloride and of titanium tetrachloride will form a slurry which is sufficiently fluid to insure such ready flow, and that normally the maintenance of a higher ratio of titanium tetrachloride, for example, two or three parts to one of ferric chloride, is more preferred for optimum results. The amount of titanium tetrachloride in the film will therefore be varied according to the iron content of the titaniferous material being chlorinated.

While the inert, liquid film used herein preferably consists of titanium tetrachloride and is caused to flow in a direction countercurrent to the gases under treatment, other liquid chlorides, such as silicon tetrachloride, carbon tetrachloride, tin tetrachloride, etc., or inert, organic materials which are more volatile than the condensing solid and which do not react with the vapor constituents at the temperatures employed in the condenser, or mixtures thereof, can be employed, as can a concurrent flowing of the liquid film and gases being treated. Additionally, any desired combination or series of separate condensers in which alternate or successive counter or co-current flow treatments of gases can be effected, can be employed. Chlorobenzene, trichloropropane are among examples of inert organic compounds contemplated for use herein. In event these liquids are used, they are conveniently separated from the condensed solid by distillation and recirculated to the reservoir 8 as desired.

The apparatus shown in Fig. II illustrates a modified form of condenser wherein treatment can be effected of a gaseous mixture with a co-currently flowing liquid film. Thus, there is shown in that figure a vertical, cylindrical casing 1' within which one or more tubular conduits 2' are positioned and through which conduits a gaseous mixture is charged for fractional condensation. The condensates 2' are disposed in spaced relationship from each other and from the internal walls of the casing 1' by means of the retaining collar members 3' and 4' which are suitably positioned within the upper and lower portions of the casing. This arrangement forms, as shown, the sealed-off channels 5' through which a cooling medium such as water can be continuously passed for flow about the exterior surfaces of the members 2' following its introduction into said channels from an inlet 7' in the lower part of the condenser. An outlet 6' is provided in the upper part of the condenser through which the cooling medium exits from the channels 5'. A reservoir 8' adapted to retain a body of liquid TiCl₄ for overflow into the open ends of the tubes 2' and thence downwardly in the form of a continuously flowing liquid film over the interior walls of said tubes is provided in the top of the condenser and within a casing head 9'. A collector 10' having a vapor outlet 11' leading, if desired, to an associated condenser such as a Fig. I type of apparatus, is provided in the bottom of the condenser, said collector having a conical reservoir 12' and a withdrawal outlet 13' through which outlet solidified iron chloride and liquid tetrachloride collected in said reservoir can be withdrawn for separation and recovery of said tetrachloride. A conduit 14' arranged to discharge into the reservoir 8' whereby liquid TiCl₄ can be fed at a controlled rate to the system is provided in the header member 9'. The latter is also provided with an inlet 15' through which a gaseous mixture to be subjected to fractional condensation can be charged into the condenser system.

The ensuing Examples III and IV are illustrative of practical adaptations of operations involving the utilization of the Fig. II type of apparatus just described.

Example III

Gaseous products from the chlorination of ilmenite, having the following composition:

|  | lb. mols/hr. | lb./hr. |
|---|---|---|
| $TiCl_4$ | .2260 | 42.9 |
| $FeCl_2$ | .1110 | 14.1 |
| HCl | .1267 | 4.6 |
| Other chlorides* | .0167 | 2.2 |
| $CO_2$ | .2678 | 11.8 |
| CO | .0893 | 2.5 |
|  | .8375 | 78.1 |

* V, Cr, Al, Si, Ca, Mg, etc.

were charged at a temperature of 950° C. into the top of a Fig. II type of washed wall condenser for passage therethrough at a gas velocity of 50 ft./sec.

This condenser consisted of a 1½" diameter, vertically mounted steel conduit 4 ft. long within an external jacketing means through which cooling water was continuously circulated at the rate of 6 G. P. M. about said conduit. Liquid TiCl₄ was introduced around the upper internal periphery of the conduit at the rate of 4.6 G. P. M. for overflow as a continuous, descending film.

Using Rotometers to measure the liquid TiCl₄ flow to and from the condenser, no difference in volume could be detected showing that neither condensation nor evaporation of TiCl₄ was significant. After 2 hours of continuous operation both the gas and liquid flows were discontinued. Inspection of the interior of the apparatus showed that its walls remained clean. Analysis of the TiCl₄ which had been circulated as a washing liquid over the internal walls of the condenser showed that it contained 28 lbs. or substantially all of the FeCl₂ which had been charged to the condenser.

The gas left the bottom of the condenser at 500° C. The gas was then quenched to 25° C. by spraying with a large excess of liquid TiCl₄ at 20° C. TiCl₄ was recovered from the slurries by distillation.

Following the conclusion of the above experiment, the furnace gases were again introduced into the top of the condenser. This time the liquid TiCl₄ was not used to wash the internal walls. The condenser plugged solidly with FeCl₂ within about 10 minutes from the start of the run.

Example IV

Employing the condenser used in Example III, gaseous products from the chlorination of a titanium-rich slag were introduced at a temperature of 1000° C. into the top of the condenser for flow therethrough at a 50 ft./sec. velocity. These gases differed importantly from the chlorination products treated in Example III in that they were saturated with respect to CaCl₂ and MgCl₂ and had the composition:

| | |
|---|---|
| TiCl₄ | .2400 lb. mols/hr. |
| FeCl₂ | .0376 |
| MgCl₂ | .0220 (24 mm.). |
| CaCl₂ | Trace (.038 mm.=.000035 mols). |
| Other chlorides | .0454 |
| CO₂ | .2640 |
| CO | .0880 |
| | .6970 |

Water and liquid TiCl₄ rates were maintained as in Example III. Again measurements with Rotometers of the liquid TiCl₄ to and from the condenser showed neither evaporation nor condensation of TiCl₄.

Analysis of the TiCl₄ circulated over the condenser walls as a washing liquid therefor after two hours of operation showed substantially complete condensation, collection and removal of the CaCl₂, MgCl₂, and FeCl₂ content of the gases treated.

The gases left the condenser at 525° C. and were quenched as in Example III for recovery of TiCl₄ values. In using my novel falling liquid film condenser, the titanium tetrachloride added to the reservoirs 8 or 8' can be obtained from any convenient source. Thus, it may be pumped from the titanium tetrachloride collector 16 as shown in Fig. I, or it may be taken from that distilled out of the iron chloride condensate. In some cases where the titanium-bearing material used in the chlorination is relatively low in iron, it is possible and desirable to recirculate a portion of the slurry of iron and titanium chlorides as obtained in the first collector since in this way a smaller amount of titanium tetrachloride has to be distilled away from the condensed iron chloride. If this is not done, an inordinately large amount of titanium tetrachloride, needed to give a continuous film, must be used to condense a small amount of ferric chloride.

The invention is not restricted to the condensation of iron chlorides from a gaseous mixture with titanium tetrachloride, but is applicable to the condensation of other types and mixtures of vaporous halides containing components which normally condense directly to the solid phase. Examples of these variants include the condensation of ferric or ferrous chloride, zinc chloride, aluminum chloride, or chromic chloride when no other condensable chlorides are present in the vapor stream, or of gaseous mixtures of ferric chloride with the chlorides of tin, silicon or vanadium, as well as the condensation and separation of chlorides of chromium, zirconium and aluminum from mixtures thereof with more volatile halides, such as the chlorides of tin, silicon, sulfur, etc. As is evident, the invention is broadly applicable to any process wherein a mixture of vapors is to be fractionally condensed, at least one component of which normally condenses directly to the solid state and another component of which is more volatile and condenses to form a liquid. In this broad case, a falling film of the more volatile component is maintained on and over the condenser walls and prevents plugging of the condenser by solid condensate.

As stated above, no prior art process for the condensation of iron chloride from mixed vapors has proved effective in preventing the formation of hard deposits on the condenser walls or for avoiding subsequent plugging of the condenser. In contrast thereto, the formation of hard, surface deposits of iron chloride is completely avoided by the presence of the liquid film on the condenser walls in accordance with this invention.

This application is a continuation-in-part of my copending application Serial No. 209,831, now abandoned, filed February 7, 1951, which, in turn, is a continuation-in-part of my application Serial No. 659,411, filed April 3, 1946, which is now abandoned.

I claim as my invention:

1. A method for continuously fractionating a vaporous metal halide condensing to the solid state from a mixture thereof with a volatilized metal halide which condenses to the liquid state, comprising charging said mixture in vaporous condition into an elongated, externally cooled condensing zone, and condensing therein said solid phase halide component through cooling out of contact with the wall surfaces of said zone by flowing said mixture over an inert liquid more volatile than said solid phase condensing component being simultaneously passed through said zone over the entire wall surfaces thereof as a film in sufficient depth to isolate said mixture and the solid condensate formed from coming in direct contact with said surfaces.

2. A continuous method for fractionally condensing vaporous iron chloride for separation from its mixture with vaporous titanium tetrachloride comprising passing the vaporized iron chloride-titanium tetrachloride mixture, while at temperatures ranging from 800–1200° C., into an elongated, externally cooled condensing zone wherein cooling of said gases to 150–700° C. and fractional condensation of said iron chloride component takes place, and prior to and during the condensation preventing iron chloride contact and condensation on the internal wall surfaces of said condensing zone by maintaining completely over said surfaces a continuous flowing film of an inert liquid more volatile than said iron chloride, said film being sufficient in depth and extent to isolate the vaporous mixture and condensed iron chloride from direct contact with said surfaces.

3. A continuous method for preventing solid ferric chloride deposition and buildup on the internal walls of a vertical, externally cooled condensing zone wherein an iron chloride is fractionally condensed from a gaseous mixture with titanium tetrachloride by cooling to a temperature below its dew point, comprising flowing a continuous, uniform film of liquid titanium tetrachloride downwardly over the entire length of the cooling surfaces of said condenser while simultaneously passing a gaseous ferric chloride-titanium tetrachloride mixture over the surfaces of said film and out of direct, physical contact with said cooling surfaces, said film being in such depth and extent as to condense the iron chloride in said gaseous mixture and retain the condensed product for removal with said film upon the latter's discharge from said zone, and thereafter recovering the titanium tetrachloride from the solidified iron chloride component.

4. A continuous method for separating iron chloride in solid state from a gaseous mixture at a temperature of 800–1200° C. of said chloride with another metal halide which comprises continuously flowing an inert liquid in the form of a protective, washing film over the entire internal wall surfaces of an elongated, restricted, externally cooled condenser, charging said gaseous mixture at a velocity of from 40–60 feet per second through said condenser and over the surfaces of said film and out of contact with said wall surfaces, withdrawing the resulting iron chloride condensate from the condenser in association with said inert liquid, and recovering the latter from said condensate.

5. A continuous method for separating iron chloride in solid state from a gaseous mixture thereof with titanium tetrachloride, comprising charging said mixture at temperatures of from 800–1200° C. into an elongated, externally cooled, restricted condenser through which an inert liquid flowing as a film is being simultaneously passed over the entire internal wall surfaces of said condenser, maintaining a velocity of from 40–60 feet per second on said mixture during its charge through said condenser and said film at a depth sufficient to prevent said mixture and resulting solid condensate from contacting said internal wall surfaces, withdrawing the iron chloride condensate in association with said inert liquid from said condenser and recovering said inert liquid from said condensate.

6. A continuous method for separating ferrous chloride in solid state from a gaseous mixture thereof with TiCl⁴, comprising charging said mixture at temperatures of from 800–1200° C. into an elongated, externally cooled, restricted condenser through which titanium tetrachloride liquid flowing as a film is being simultaneously passed over the entire internal wall surfaces of said condenser, maintaining a gas velocity of from 40–60 feet per second on said mixture during its charge through said condenser and said film at a depth sufficient to prevent said mixture and any resulting condensate from contacting said internal wall surfaces, withdrawing solidified ferrous chloride in association with said liquid TiCl⁴ from said condenser and recovering the TiCl⁴ from said solid ferrous chloride.

7. A continuous method for separating iron chloride in solid state from a gaseous mixture thereof with titanium tetrachloride comprising charging said mixture at temperatures ranging from 800–1200° C. into an elongated, externally cooled condenser wherein said mixture is reduced in temperature to about 300–500° C., during said charging simultaneously passing in a direction countercurrent to the passage of said mixture an inert liquid in the form of a flowing film over the entire internal wall surfaces of said condenser, maintaining a velocity of from 40–60 feet per second on said mixture during its charge through said condenser and said film at a depth sufficient to prevent said mixture and any resulting solid condensate from contacting said internal wall surfaces, withdrawing the iron chloride condensate in association with said inert liquid from said condenser, and recovering said inert liquid from said condensate.

8. A continuous method for separating iron chloride in solid state from a gaseous mixture thereof with titanium tetrachloride comprising charging said mixture at temperatures ranging from 800–1200° C. into an elongated, externally cooled condenser wherein said mixture is reduced in temperature to about 300–500° C., during said charging simultaneously passing in a direction cocurrent with the passage of said mixture an inert liquid in the form of a flowing film over the entire internal wall surfaces of said condenser, maintaining a velocity of from 40–60 feet per second on said mixture during its charge through said condenser and said film at a depth sufficient to prevent said mixture and any resulting solid condensate from contacting said internal wall surfaces, withdrawing the iron chloride condensate in association with said inert liquid from said condenser, and recovering said inert liquid from said condensate.

9. A continuous method for preventing solid iron chloride from depositing and accumulating on the surfaces of a condenser employed in fractionally condensing said chloride from a gaseous mixture thereof with titanium tetrachloride during the cooling of said mixture to below the dew point of said iron chloride, comprising continuously charging said mixture through said condenser while simultaneously passing an inert liquid as a uniformly flowing film over the entire internal wall surfaces of said condenser, maintaining a velocity of from 40–60 feet per second on said mixture throughout its charge through said condenser, withdrawing the solidified iron chloride together with said inert liquid from said condenser, and recovering said liquid from said solid iron chloride.

10. A continuous method for separating and during the separation preventing solid ferric chloride from depositing on the walls of a vertical condensing zone wherein said chloride is fractionally condensed from a gaseous mixture with titanium tetrachloride by cooling to a temperature below its dew point, comprising throughout the condensation flowing a continuous, uniform film of liquid titanium tetrachloride downwardly over the entire length of the surfaces of the cooling walls of said condenser while simultaneously passing a gaseous ferric chloride-titanium tetrachloride mixture upwardly over the surfaces of said downwardly moving film and out of direct, physical contact with said cooling wall surfaces, said flowing film being in such depth and thickness over said cooling wall surfaces that ferric chloride condensed from said gaseous mixture is retained in said film and removed from said condenser upon discharge of said film from said zone.

11. In a method of condensing and removing condensable vapor, the steps comprising, continuously passing said condensable vapor over a solid condensing surface adjacent thereto, refrigerating the condensable vapor by removal of heat through said condensing surface to a temperature sufficient to condense said condensable vapor to at least a partially solid state, and continuously passing a film of liquid over said condensing surface in contact therewith, whereby as said condensed vapor is condensed it is continuously prevented by said liquid from adhering to said condensing surface.

References Cited in the file of this patent

UNITED STATES PATENTS

| | | |
|---|---|---|
| 2,245,077 | Muskat et al. | June 10, 1941 |
| 2,245,358 | Pechukas | June 10, 1941 |
| 2,306,184 | Pechukas | Dec. 22, 1942 |
| 2,311,466 | Pechukas | Feb. 16, 1943 |